(12) United States Patent
Ruf

(10) Patent No.: US 6,277,490 B1
(45) Date of Patent: Aug. 21, 2001

(54) COLOR DEVELOPER PIGMENT FOR CARBONLESS COPYING PAPER

(75) Inventor: Friedrich Ruf, Tiefenbach (DE)

(73) Assignee: Sud-Chemie AG, Munich (DE)

( * ) Notice: Subject to any disclaimer, the term of this patent is extended or adjusted under 35 U.S.C. 154(b) by 0 days.

(21) Appl. No.: 09/201,923

(22) Filed: Dec. 1, 1998

(30) Foreign Application Priority Data

Dec. 1, 1997 (DE) .............................................. 197 53 271

(51) Int. Cl.⁷ ....................................................... B32B 5/16
(52) U.S. Cl. ........................ 428/404; 106/482; 106/491; 427/215; 427/221; 427/443.2; 428/407
(58) Field of Search ................................. 428/331, 403, 428/404, 407; 106/482, 491; 427/212, 215, 220, 221, 443.2

(56) References Cited

U.S. PATENT DOCUMENTS

| | | | |
|---|---|---|---|
| 4,296,948 | * 10/1981 | Satoh et al. | 282/27.5 |
| 4,405,371 | * 9/1983 | Sugahara et al. | 106/21 |
| 4,867,844 | * 9/1989 | Dessauer | 162/135 |
| 4,889,885 | * 12/1989 | Usuki et al. | 524/445 |
| 5,039,377 | * 8/1991 | Von Raven et al. | 162/78 |
| 5,318,939 | * 6/1994 | Laver et al. . | |
| 5,637,552 | * 6/1997 | Hahn et al. . | |

FOREIGN PATENT DOCUMENTS

2147326 * 10/1995 (CA) .
WO94/26532 * 11/1994 (WO) .

* cited by examiner

*Primary Examiner*—H. Thi Le
(74) *Attorney, Agent, or Firm*—Scott R. Cox

(57) ABSTRACT

A color developer pigment for carbonless copying papers based on acid-activated smectitic layered silicates, wherein a phenolic resin is condensed on the acid-activated layered silicate. The invention also concerns a coating composition based on the color developer pigment as well as a copying paper containing the color developer pigment.

12 Claims, No Drawings

COLOR DEVELOPER PIGMENT FOR CARBONLESS COPYING PAPER

The invention concerns a color developer pigment for carbonless copying papers.

BACKGROUND OF INVENTION

Self-copying papers or carbonless copying papers have been known since the early '50s. They are now used in large amounts in banking and freight forms, bills of lading, invoices, etc. They usually consist of two or more sheets of paper, one on top of the other, in which the upper sheet has a chromophore or color donor layer on the back (CB=coated back) and the lower sheet has a dye or color acceptance layer on the front (CF=coated front). The main component of the color donor layer is thick-walled microcapsules of gelatins, polyurethane, melamine-formaldehyde and similar substances that contain solutions of dyes in the so-called leucoform. These only slightly-colored dye precursors, mostly from the class of di- or triphenylmethanes, thiazines, spiropyrans, or fluorans, act as electron donors (Lewis bases) and can be converted to the dye form in a chemical reaction with electron acceptors (Lewis acids). Such Lewis acids are found in the dye acceptance layer in the form of acid phenolic resins, zinc salicylates or acid-activated clay minerals, especially in the form of acid-activated smectitic layered silicates. If the walls of the microcapsules are destroyed during writing on the carbonless copying paper by the writing pressure, the capsule contents (the dye solution) is released and develops on the Lewis acid acceptance layer, forming a copy.

The individual color developer systems have different reaction mechanisms. Thus, the organic products (phenolic resin, zinc salicylate) are partially dissolved by the capsule solvent and the color reaction occurs in a homogeneous, organic phase. The copies so developed exhibit good color stability, even at high humidity (tropical climate) and limited sensitivity to environmental effects (e.g., $NO_x$, $SO_2$, etc). The relatively slow development of the copies (especially at low temperatures) and severe yellowing of the paper under the influence of light are considered negative, mostly in the phenolic resins.

The acid-activated clays (smectitic layered silicates) are capable of absorbing the dyes and developing them in heterogeneous catalysis, because of their high specific surface areas of about 300 $m^2/g$. The capsule solvents are absorbed, in this case, in the pores of the clay. Rapid color development, good light stability and limited yellowing tendency are advantages in the acid-activated clays. On the other hand, a problem is the sensitivity of the copy to high humidity and environmental gases.

Attempts to combine both systems (phenolic resin and acid-activated clay) have recently been observed on the market. Both compounds are combined during coating composition preparation and applied together to the base paper. The papers so produced, however, have a strong yellowing tendency and significant sensitivity to humidity.

It has now been found that the aforementioned problems can be eliminated and the quality of the color developer pigment significantly improved, if the phenolic resin is condensed on the surface of the acid-activated smectitic layered silicate.

SUMMARY OF INVENTION

The object of the invention is therefore a color developer pigment for carbonless copying papers based on acid-activated smectitic layered silicates, characterized by the fact that a phenolic resin is condensed on the acid-activated layered silicate.

DETAILED DESCRIPTION OF THE PREFERRED EMBODIMENT

The term "acid-activated smectitic layered silicate" is referred to below, in some instances, as "acid-activated clay" for simplicity.

The properties of the "phenolic resin" and "acid clay" are advantageously combined by the color developer pigment of the invention. The color developer pigment according to the invention is characterized by good rheological properties and can be processed with no significant problems with the common coating units.

The acid-activated smectitic layered silicate is preferably derived from a smectitic layered silicate from the group bentonite, beidellite, nontronite, saponite and/or hectorite.

The acid-activated smectitic layered silicate preferably has a specific surface area of about 120 to 360 $m^2/g$ and a pH value (in aqueous suspension) of about 1 to 5.5.

The specific surface area is determined according to the so-called BET method at liquid nitrogen temperature, described in *J Am. Chem. Soc.* 60 309 (1938) by S. Brunauer, P. H. Emmet and E. Teller (one-point method according to DIN 66 131 and 66 132). The pH value in an aqueous suspension (10 wt. %) is determined by means of a glass electrode according to DIN ISO 7879.

The acid-activated smectitic layered silicate generally has a total iron oxide content from 0.5 to 4.5 wt. %. It has also proven advantageous to dope the acid-activated smectitic layered silicate with $Zn^{2+}$ ions.

The phenolic resin, derived from a phenol substituted in the p position, and formaldehyde is preferably condensed on the acid-activated layered silicate. The substituent in the p position is preferably a lower alkyl group, more preferably a tert-butyl group or a nonyl group, a lower alkoxy or oxyalkyl group or a phenyl group. However, other phenol derivatives conventional for production of phenolic resins for carbonless copying papers can also be used.

Another object of the invention is a process for production of the color developer pigment discussed above, characterized by the fact that a solution or emulsion of at least one phenol, preferably a phenol substituted in the p position, is added to a suspension of acid-activated smectitic layered silicate, polycondensation to from the phenolic resin is carried out by adding formaldehyde and the layered silicate coated with the phenolic resin is separated from the suspension.

Condensation of the phenolic resin is preferably run in an aqueous medium by raising the temperature to about 50 to 80° C. as an acid-catalyzed reaction, in which the acid-activated layered silicate can itself serve as catalyst. However, the reaction can also be carried out by reducing the pH value to about 2 by adding an acid, like aqueous hydrochloric acid.

The layered silicate coated with the phenolic resin is preferably separated by filtration, (especially vacuum filtration) and the filter cake is washed with water to remove excess acid and any unconverted formaldehyde. The filter cake is then dried and optionally adjusted by wet grinding to the desired particle size.

A further object of the invention is an aqueous coating composition containing the aforementioned color developer pigment and optionally an extender pigment in a concentration of about 30 to 50 wt. %, preferably about 38 to 48 wt. %, as well as an ordinary binder.

A further object of the invention is a copying paper coated with the color developer pigment and the corresponding coating composition just described. The coating weight of the color developer formulation (color developer pigment according to the invention, optional extender pigment and binder) is preferably about 2 to 8 g/m², especially about 4 to 6 g/m². The paper is preferably in the form of a CF sheet coated with the color developer pigment.

EXAMPLES

The invention is explained in nonlimiting fashion by the following examples.

Examples 1

The following reaction partners were used:
a) acid-activated bentonite (Copisil®) with the following properties:

| | |
|---|---|
| specific surface (BET) | 310 m²/g |
| brightness R457* | 86% |
| $Fe_2O_3$ content | 1.4 wt. % |
| pH value | 3.0 | b) p-tert-butylphenol, m.p. 100–101° C.;
c) formaldehyde solution in water, 30%.

The brightness is determined by measuring the reflection factor R457 according to DIN 53 145 on an Elrepho® 2000 from the Datacolor Company versus $BaSO_4$ as white standard.

General Operating Method

The acid-activated bentonite (AAB) was dispersed 10 wt. % in water and the pH value set by adding small amounts of semi-concentrated hydrochloric acid to 2.5. A roughly 90° C. hot 5 wt. % aqueous solution of p-tert-butylphenol was rapidly added to this well agitated suspension and the mixture homogenized for 10 minutes. The temperature of the suspension was raised to 70–75° C. and a 4-fold molar amount (referring to the employed phenol) of formaldehyde (30%) was then slowly added. After a reaction time of 90 minutes at 75° C., it was filtered hot by means of a vacuum and the filter cake was washed acid-free with fresh water. The roughly 35 wt. % filter cake was redispersed after addition of small amounts of fresh water and ground in a Fryma ball mill to a particle size of <15 μm and an average particle diameter of $d_p$=2.5 μm. The Sedigraph® 5000 C was used for particle analysis, in which preparation of the sample 6 to 7 g) occurred by 15 minutes of heating under reflux in 90 mL of a 0.002 M $Na_4P_2O_7 \cdot 10H_2O$ solution. The residue at 10 μm (R 10 μm) and the $d_k$ value, i.e., the average particle diameter, were recorded.

The suspension of the color developer pigment according to the invention so obtained was mixed in a 25/75 ratio (oven-dried/oven-dried) with calcium carbonate (Hydrocarb 40®) and the total solids content of the pigment suspension adjusted to 45 wt. % with water. The CF coating composition was completed by adding 10 parts by weight (oven-dried) styrene-butadiene latex (DL 950) under mild agitation. The color developer was coated with a manual doctor onto a wood-free coating base paper (50 g/m²) at 4–5 g/m² coating weight, the sheet dried and slightly calendered. After equilibration at 50% relative humidity, the copying performance was investigated.

Investigation Methods

Rate of color development. A copy was produced by means of a matrix printer (letter grid "M", 5×5 cm) on the CF sheets equilibrated at 50% relative humidity with a commercially available first sheet (CB, blue-printing). The rate of development of the blue printing was followed visually over 2 minutes and evaluated.

A differentiating classification occurred with reference to a very rapidly developing acid clay—CF as scale:

++ = very fast

+ = acceptable

− = slow

Contrast 24 h. The above developed copy was stored with exclusion of light for 24 hours at 50% relative humidity and the contrast determined on an Elrepho apparatus (Datacolor Company, Ry filter):

contrast=Ry/CF–Ry/copy (%).

The higher this value, the more intense the copy.

Stability to humidity. The copy developed above was exposed for 7 days to a "tropical climate" (70° C./70% relative humidity). After removal from the climate chamber, the contrast was immediately determined as above. Loss of contrast indicates sensitivity of the copy to humidity. Yellowing tendency. An unprinted CF sheet was exposed in a Suntester (Heraeus, Suntest CPS) for 2 hours to a high-energy solar spectrum (xenon lamp). The coating whiteness of the CF sheet (Elrepho, R457) was measured before and after exposure.

Yellowing=R457 (unexposed)–R457 (exposed) (%)

The smaller this value, the lower the yellowing tendency. The employed acid clay/tertbutylphenol ratios in Example 1 were:

| Experiment | AAB | p-tert-butylphenol |
|---|---|---|
| 1a | 95 | 5 |
| 1b | 90 | 10 |
| 1c | 75 | 25 |
| 1d | 50 | 50 |
| 1e | 25 | 75 |
| 1r | 5 | 95 |

The table summarizes the results of the experiments.

Example 2

Example 2 was conducted similar to Example 1, Experiment 1 c, except that a p-phenylphenol (m.p. 165–168° C.) was used instead of p-tert-butylphenol.

Example 3

Example 3 was conducted similar to Example 1, Experiment 1 c, except that AAB was doped beforehand with the $Zn^{2+}$ ions. For this purpose, the AAB was dispersed 10% in distilled water and a solution of $ZnCl_2$ in distilled water (10 wt. % $ZnCl_2$ on AAB corresponds to 4.8 wt. % $Zn^{2+}$ on clay) was added dropwise. This was agitated for 4 hours at room temperature and then filtered off under low vacuum. The filter cake was used for conversion with phenol. Analysis showed that 2.8 wt. % $Zn^{2+}$ was adsorbed on the AAB.

Example 4
(Comparison)

A commercially available phenolic resin for use in self-copying papers (HRJ 4023, Schenectady) was processed to a coating formula similar to Example 1: 25 parts by weight phenolic resin/75 parts by weight Hydrocarb 40®/10 parts by weight latex, solids 45 wt. %. The color was doctored onto the base paper in similar fashion.

Example 5
(Comparison)

The AAB (Copisil®, Süd Chemie AG) used in Examples 1–3 was applied to a standard formulation for comparison:

| | | |
|---|---|---|
| Copisil ® | 75 parts | |
| Hydrocarb 40 ® | 25 parts | |
| Latex | 20 parts | |
| Solids | 45% | |

Example 6
(Comparison)

According to this example, 18.75 parts by weight of the Copisil® used in the previous examples was cut with 6.25 parts by weight of the phenolic resin HRJ 4023 and applied to the base paper after addition of 75 parts by weight Hydrocarb 40® and 10 parts by weight latex.

This example corresponds in amount ratios to Experiment 1c of Example 1, but operates with a simple mixture - without the in situ condensation according to the invention.

The table shows that the formulas according to Examples 1, 2 and 3 of the invention are superior to the phenolic resin formula according to Example 4, and also the mechanical mixture according to Example 6. In comparison with the AAB formula according to Example 5, better stability relative to high humidity was achieved.

| Example | Coating weight g/m² | Development rate | Contrast 24 h % | Contrast after tropical climate % | Yellowing tendency % |
|---|---|---|---|---|---|
| 1a | 4.6 | ++ | 40.1 | 41.0 | 3.3 |
| 1b | 4.2 | ++ | 39.9 | 41.6 | 4.3 |
| 1c | 4.2 | ++ | 40.9 | 42.6 | 4.2 |
| 1d | 5.0 | + | 39.8 | 42.0 | 4.9 |
| 1e | 4.8 | + | 39.5 | 41.2 | 5.0 |
| 1f | 4.2 | + | 39.3 | 41.6 | 5.0 |
| 2 | 4.5 | + | 39.8 | 41.0 | 4.0 |
| 3 | 4.7 | ++ | 40.8 | 41.5 | 4.3 |
| 4 | 4.6 | − | 38.5 | 40.2 | 8.2 |
| 5 | 4.8 | ++ | 40.7 | 37.5 | 2.5 |
| 6 | 4.6 | ++ | 40.5 | 36.3 | 6.2 |

What is claimed is:

1. A color developer pigment for carbonless copying papers comprising an acid-activated smectitic layered silicate, and a phenolic resin, wherein the phenolic resin is condensed on the acid-activated smectitic layered silicate.

2. The color developer pigment of claim 1 wherein the acid-activated smectitic layered silicate is selected from the group consisting of bentonite, beidellite, nontronite, saponite, and hectorite.

3. The color developer pigment of claim 1 wherein the acid-activated smectitic layered silicate has a specific surface area of about 120 to 360 m²/g.

4. The color developer pigment of claim 1 wherein the acid-activated smectitic layered silicate has a pH value in an aqueous suspension of about 1 to about 5.5.

5. The color developer pigment of claim 1 wherein the acid-activated smectitic layered silicate is doped with $Zn^{2+}$ ions.

6. The color developer pigment of claim 1 wherein the phenolic resin is derived from the reaction of a phenol, with a substituent substituted in the p position, and a formaldehyde.

7. The color developer pigment of claim 6 wherein the substituent in the p position on the phenol is selected from the group consisting of a tert-butyl group, nonyl groups, oxyalkyl groups, and phenyl groups.

8. The color developer pigment of claim 1 produced by the process of preparing a suspension of an acid-activated smectitic layered silicate, adding a solution or emulsion of a phenol to said suspension, polycondensing the phenol to a phenolic resin by adding formaldehyde to the suspension, thereby coating the acid-activated smectitic layered silicate with the phenolic resin, and separating the coated acid-activated smectitic layered silicate from the suspension.

9. The product of claim 8, wherein the polycondensation of the phenol is conducted in an aqueous medium at a temperature from about 50 to about 80° C.

10. The product of claim 8, wherein the polycondensation of the phenol is conducted in an aqueous medium by reducing the pH of the suspension.

11. The product of claim 8 further comprising filtering the smectitic layered silicate coated with the phenolic resin to form a filter cake, washing the filter cake, and drying the washed filter cake.

12. The product of claim 11 further comprising wet grinding the dried filter cake to a desired particle size.

* * * * *